US011746660B2

(12) United States Patent
Whittle et al.

(10) Patent No.: US 11,746,660 B2
(45) Date of Patent: Sep. 5, 2023

(54) GAS TURBINE ENGINE COMPONENTS WITH FOAM FILLER FOR IMPACT RESISTANCE

(71) Applicants: Rolls-Royce plc, London (GB); Rolls-Royce High Temperature Composites Inc., Cypress, CA (US)

(72) Inventors: Michael J. Whittle, London (GB); Stephen Harris, Cypress, CA (US)

(73) Assignees: Rolls-Royce plc; Rolls-Royce High Temperature Composites Inc., Cypress, CA (US)

( * ) Notice: Subject to any disclaimer, the term of this patent is extended or adjusted under 35 U.S.C. 154(b) by 0 days.

(21) Appl. No.: 17/557,027

(22) Filed: Dec. 20, 2021

(65) Prior Publication Data

US 2023/0193763 A1 Jun. 22, 2023

(51) Int. Cl.
*F01D 5/18* (2006.01)
*F01D 5/28* (2006.01)
*F01D 5/14* (2006.01)

(52) U.S. Cl.
CPC ............ *F01D 5/18* (2013.01); *F01D 5/147* (2013.01); *F01D 5/282* (2013.01); *F01D 5/284* (2013.01); *F05D 2250/75* (2013.01); *F05D 2260/231* (2013.01); *F05D 2300/6033* (2013.01); *F05D 2300/612* (2013.01)

(58) Field of Classification Search
CPC . F01D 5/18; F01D 5/282; F01D 5/284; F01D 5/147
See application file for complete search history.

(56) References Cited

U.S. PATENT DOCUMENTS

| | | | |
|---|---|---|---|
| 4,285,634 A | 8/1981 | Rossman et al. | |
| 5,127,802 A * | 7/1992 | Carlson | B29C 44/18 29/889.71 |
| 5,690,469 A * | 11/1997 | Deal | F01D 9/042 29/889.22 |
| 6,412,541 B2 | 7/2002 | Roesler et al. | |
| 6,435,824 B1 | 8/2002 | Schell et al. | |
| 6,514,046 B1 | 2/2003 | Morrison et al. | |
| 7,410,342 B2 | 8/2008 | Matheny | |
| 7,753,654 B2 | 7/2010 | Read et al. | |
| 7,775,766 B2 | 8/2010 | Meier et al. | |
| 7,823,529 B2 | 11/2010 | Mack et al. | |
| 7,824,152 B2 * | 11/2010 | Morrison | F01D 25/246 415/200 |
| 7,905,016 B2 | 3/2011 | James et al. | |
| 8,333,552 B2 | 12/2012 | Wood et al. | |
| 8,980,435 B2 | 3/2015 | De Diego | |
| 9,739,157 B2 | 8/2017 | Uskert et al. | |
| 9,759,090 B2 | 9/2017 | Uskert et al. | |
| 9,896,943 B2 | 2/2018 | Crpsatti et al. | |
| 9,920,634 B2 | 3/2018 | Uskert et al. | |
| 10,180,071 B2 | 1/2019 | Freeman et al. | |
| 10,458,653 B2 | 10/2019 | Freeman et al. | |
| 2005/0249602 A1 | 11/2005 | Freling et al. | |

(Continued)

*Primary Examiner* — Michael L Sehn
(74) *Attorney, Agent, or Firm* — Barnes & Thornburg LLP

(57) ABSTRACT

An airfoil assembly for a gas turbine engine includes an airfoil extending radially relative to a central reference axis. A spar is located within the airfoil and spaced from the airfoil at all radial locations along the airfoil such that a gap is maintained between the airfoil and the spar. A foam is located between the airfoil and the spar.

19 Claims, 9 Drawing Sheets

(56) References Cited

U.S. PATENT DOCUMENTS

2013/0094971 A1  4/2013 Lacy et al.
2016/0348586 A1  12/2016 Uskert et al.
2018/0009201 A1  1/2018 Sellinger et al.

* cited by examiner

GAS TURBINE ENGINE COMPONENTS WITH FOAM FILLER FOR IMPACT RESISTANCE

FIELD OF THE DISCLOSURE

The present disclosure relates generally to gas turbine engines, and more specifically to adapting an airfoil assembly and a turbine shroud assembly for use in a gas turbine engine.

BACKGROUND

Components in a gas flowpath of a turbine engine are susceptible to impact from foreign and domestic objects. The use of ceramic matrix composites makes this challenge particularly acute because ceramic matrix composites are inherently brittle.

Additionally, the components are susceptible to high temperatures, which further increase stresses on the components. In some cases, impingement cooling schemes may be utilized to reduce temperatures in the engine. However, impingement cooling schemes typically create hot spots in the components, which generate high localized thermal gradients. These high gradients increase thermal stresses, which can increase damage and reduce the life of components in service. Accordingly, it is desirable to adapt the components to have improved thermal gradients and impact resistance.

SUMMARY

The present disclosure may comprise one or more of the following features and combinations thereof.

According to a first aspect of the disclosed embodiments, an airfoil assembly for a gas turbine engine includes an airfoil made of ceramic matrix composite materials and extending radially relative to a central reference axis. A spar is made of metallic materials and is located within the airfoil and spaced from the airfoil at all locations along an inner surface of the airfoil such that a gap is maintained between the inner surface of the airfoil and the spar. A foam is located between the airfoil and the spar along at least one discrete location to alter at least one of a thermal gradient or an impact resistance along the airfoil assembly. The foam is at least one of a metallic foam and a ceramic foam.

In some embodiments of the first aspect, the foam may engage directly the airfoil and the spar. The gap may be airfoil-shaped and the entire gap may be filled with the foam. The spar may be formed to define a radially extending passage therein and the foam may be further located in the radially extending passage. The foam may be formed from at least one of a cobalt alloy and silicon carbide.

Optionally, in the first aspect, the airfoil may have a leading edge, a trailing edge, a pressure side, and a suction side. The foam may extend along a first segment of the airfoil that includes a portion of the pressure side, the leading edge, and a portion of the suction side such that first segment is generally C-shaped. Terminal ends of the first segment may be exposed to air located in the gap. A length of the portion of the suction side of the first segment may be greater than a length of the portion of the pressure side of the first segment.

In some embodiments, the at least one discrete location may include a first section of foam at a trailing edge of the airfoil and extending partially along a suction side of the airfoil. The at least one discrete location may include a second section of foam at a leading edge of the airfoil and extending partially along a pressure side of the airfoil and partially along a suction side of the airfoil. The second section may be spaced apart from the first section to allow airflow between and along the first section and the second section.

It may be desired, in the first aspect, that an inner end wall may be spaced radially inward of an outer end wall relative to the central reference axis. The airfoil may extend radially between the inner end wall and the outer end wall. The airfoil may extend to a terminal end and may be configured to rotate about the central reference axis.

According to a second aspect of the disclosed embodiments, an airfoil assembly for a gas turbine engine includes an airfoil extending radially relative to a central reference axis. A spar is located within the airfoil and spaced from the airfoil at all locations along the airfoil such that a gap is maintained between the airfoil and the spar. A foam is located between the airfoil and the spar along at least one discrete location to alter at least one of a thermal gradient or an impact resistance along the airfoil assembly.

In some embodiments of the second aspect, the airfoil may have a leading edge, a trailing edge, a pressure side, and a suction side. The foam may extend along a first segment of the airfoil that includes a portion of the pressure side, the leading edge, and a portion of the suction side such that first segment is generally C-shaped. Terminal ends of the first segment may be exposed to air located in the gap. A length of the portion of the suction side of the first segment may be greater than a length of the portion of the pressure side of the first segment.

In some embodiments, the at least one discrete location may include a first section of foam at a trailing edge of the airfoil and extending partially along a suction side of the airfoil. A second section of foam may be located at a leading edge of the airfoil and may extend partially along a pressure side of the airfoil and partially along a suction side of the airfoil and the second section is spaced apart from the first section to allow airflow between and along the first section and the second section.

Optionally, in the second aspect, an inner end wall may be spaced radially inward of an outer end wall relative to the central reference axis. The airfoil may extend radially between the inner end wall and the outer end wall. The airfoil may extend to a terminal end and may be configured to rotate about the central reference axis.

According to a third aspect of the disclosed embodiments, a method of adapting an airfoil assembly for use in a gas turbine engine includes extending an airfoil radially outward from a central reference axis. The method also includes spacing a spar from the airfoil at all locations along the airfoil such that a gap is maintained between the airfoil and the spar. The method also includes locating a foam between the airfoil and the spar along at least one discrete location to alter at least one of a thermal gradient along the airfoil assembly or an impact resistance along the airfoil assembly. The foam is at least one of a metallic foam and a ceramic foam.

In some embodiments of the third aspect, the method may include dispersing a section of foam only at a leading edge of the vane and extending partially along a pressure side of the vane and partially along a suction side of the vane. The method may also include dispersing a section of foam only at a trailing edge of the vane and extending partially along a suction side of the vane.

These and other features of the present disclosure will become more apparent from the following description of the illustrative embodiments.

DETAILED DESCRIPTION OF THE DRAWINGS

Figure 1:
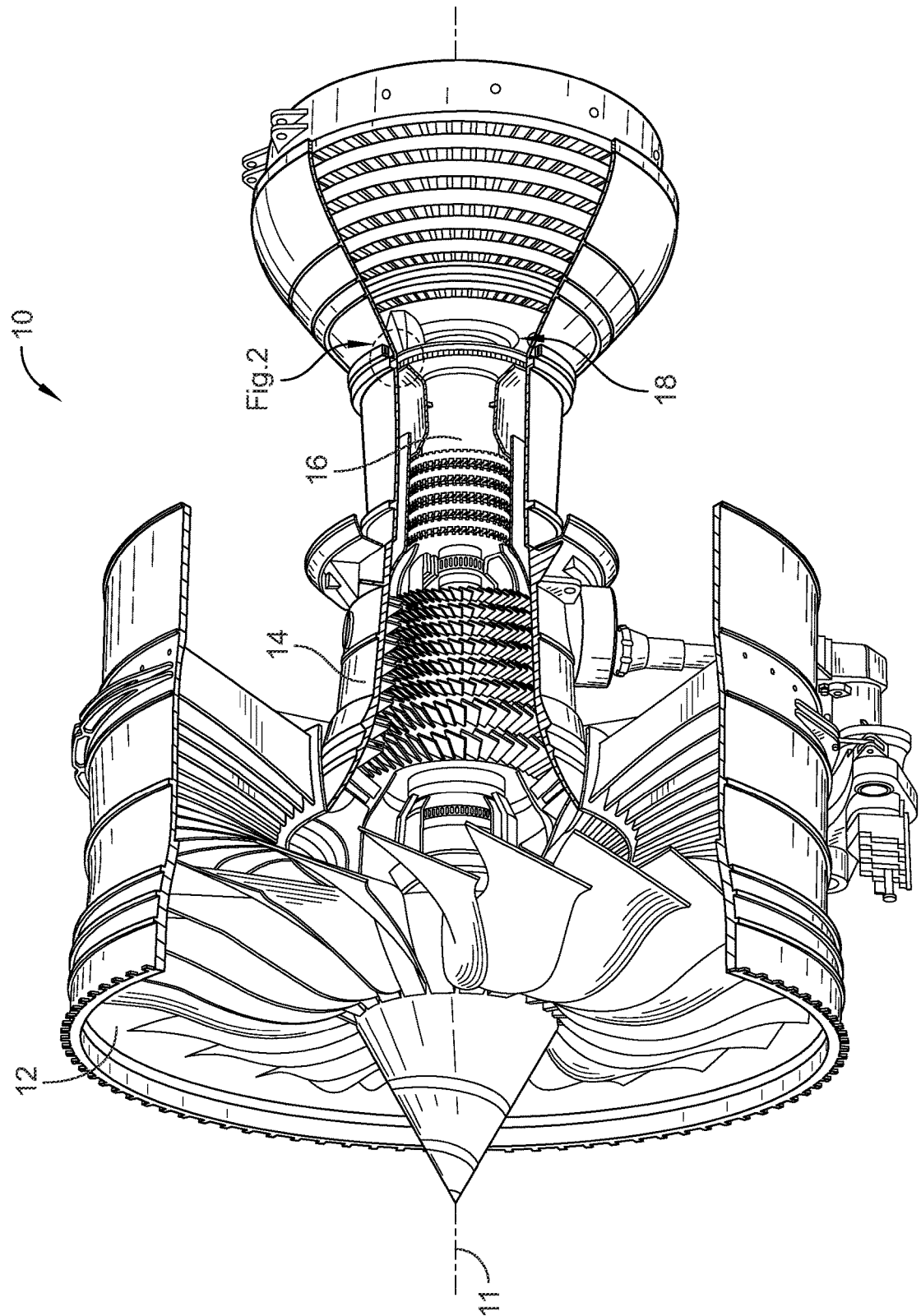
FIG. 1 is a cutaway view of a gas turbine engine that includes a fan, a compressor, a combustor, and a turbine assembly in accordance with the present disclosure that is adapted to extract work from hot combustion products received from the combustor.

For the purposes of promoting an understanding of the principles of the disclosure, reference will now be made to a number of illustrative embodiments illustrated in the drawings and specific language will be used to describe the same.

A turbine assembly 18 according to the present disclosure is adapted for use in a gas turbine engine 10 as suggested in FIG. 1. The gas turbine engine 10 includes a fan 12, a compressor 14, a combustor 16, and the turbine assembly 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine assembly 18 where the turbine assembly 18 extracts work from the gases to drive the compressor 14 and the fan 12. In other embodiments, the gas turbine engine 10 may include a shaft, turboprop, or gearbox in place of the fan 12.

Figure 2:
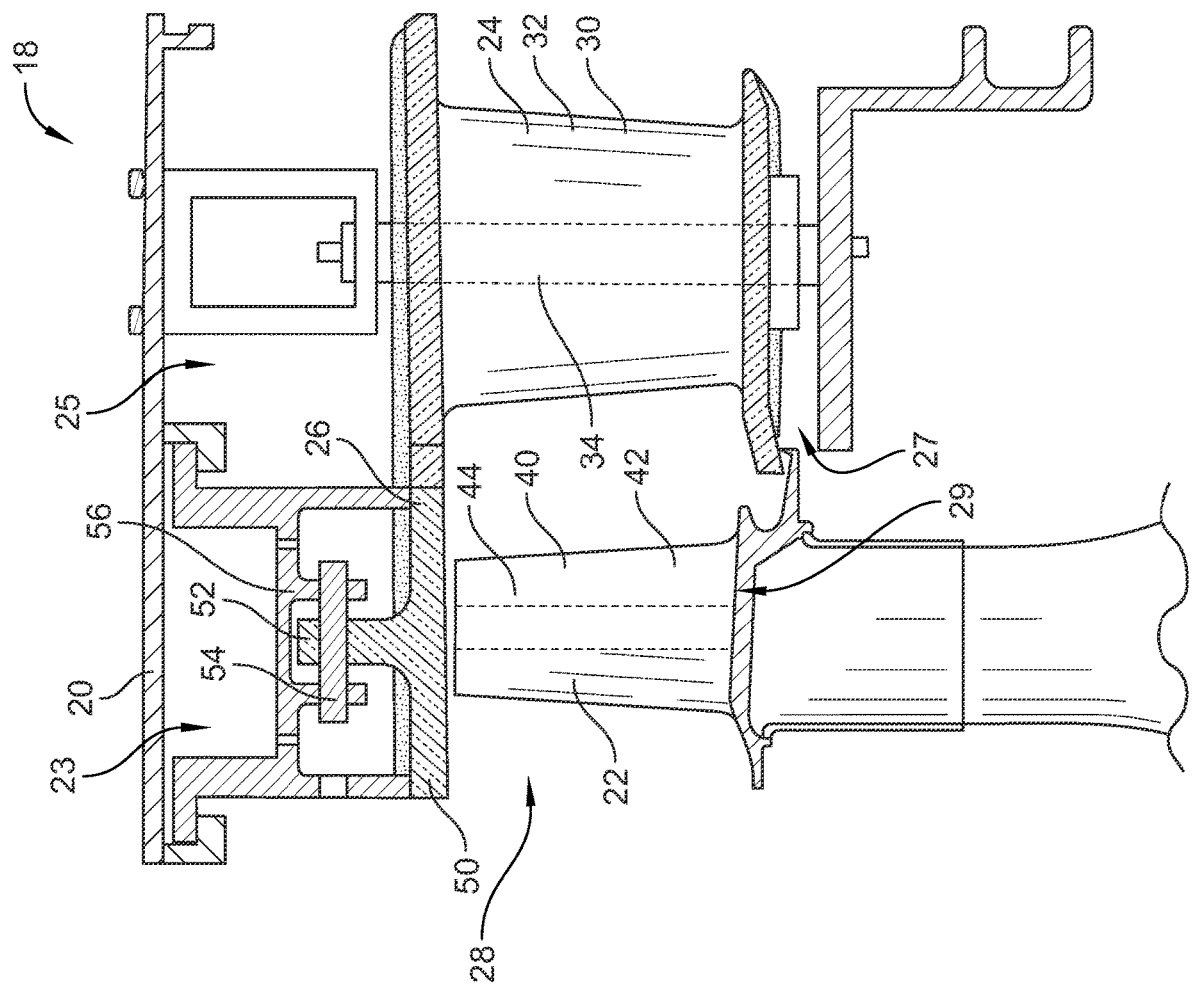
FIG. 2 is a cross sectional view of a portion of the turbine assembly of the gas turbine engine of FIG. 1 showing that the turbine assembly includes one of a plurality of turbine wheel assemblies, a turbine shroud assembly arranged radially outward of the turbine wheel assembly, and a vane stage made up of a vane with an airfoil each having a metallic foam layer for impact resistance and/or thermal gradient protection.

Referring now to FIG. 2, the turbine assembly 18 includes, among other things, a turbine case 20, a plurality of turbine wheel assemblies 22, a vane stage 24, and a turbine shroud 26. The turbine case 20 is generally arranged around a central reference axis 11 (shown in FIG. 1). Each turbine wheel assembly 22 is configured to interact with the hot combustion gases from the combustor 16 and rotate about the central reference axis 11 of the gas turbine engine 10 to drive the compressor 14 and/or the fan 12.

Cooling air is provided to the turbine assembly 18 to cool the components. The cooling air may be provided by the compressor 14 for example. The cooling air is provided to cavities 23, 25 and directed to pass over the vane stage 24 and the turbine shroud 26. Cooling air may also be directed along a radial inner portion of the vane stage 24 via cavity 27 and may be directed into the turbine wheel assembly 22 via passage 29.

The vane stage 24 is located aft of the turbine wheel assembly 22 and includes a turbine vane 30 configured to redirect air moving through a primary gas path 28 of the gas turbine engine 10. The turbine vane 30 includes an airfoil 32 and a spar 34. In some embodiments, the airfoil 32 is made of ceramic matrix composite materials, while the spar 34 is made of metallic materials. The spar 34 provides structural support for the turbine vane 30 and transfers force loads acting on the turbine vane 30 to the turbine case 20.

The turbine wheel assembly 22 includes a blade 40 configured to rotate about the central reference axis 11 to move air through the primary gas path 28 of the gas turbine engine 10. The blade 40 includes an airfoil 42 and a mounting 44. In some embodiments, the airfoil 42 is made of ceramic matrix composite materials, while the mounting 44 is made of metallic materials. The mounting 44 provides structural support for the blade 40.

The turbine shroud 26 includes a shroud wall 50 extending circumferentially around the central reference axis 11 and an attachment feature 52 extending radially outward from the shroud wall 50. The turbine shroud 26 is coupled to the turbine case 20 by at least one pin 54 extending through a portion of a carrier segment coupled with the turbine case 20 and an opening 56 formed in the attachment feature 52. The turbine shroud 26 extends circumferentially partway around the turbine wheel assembly 22.

Figure 3:
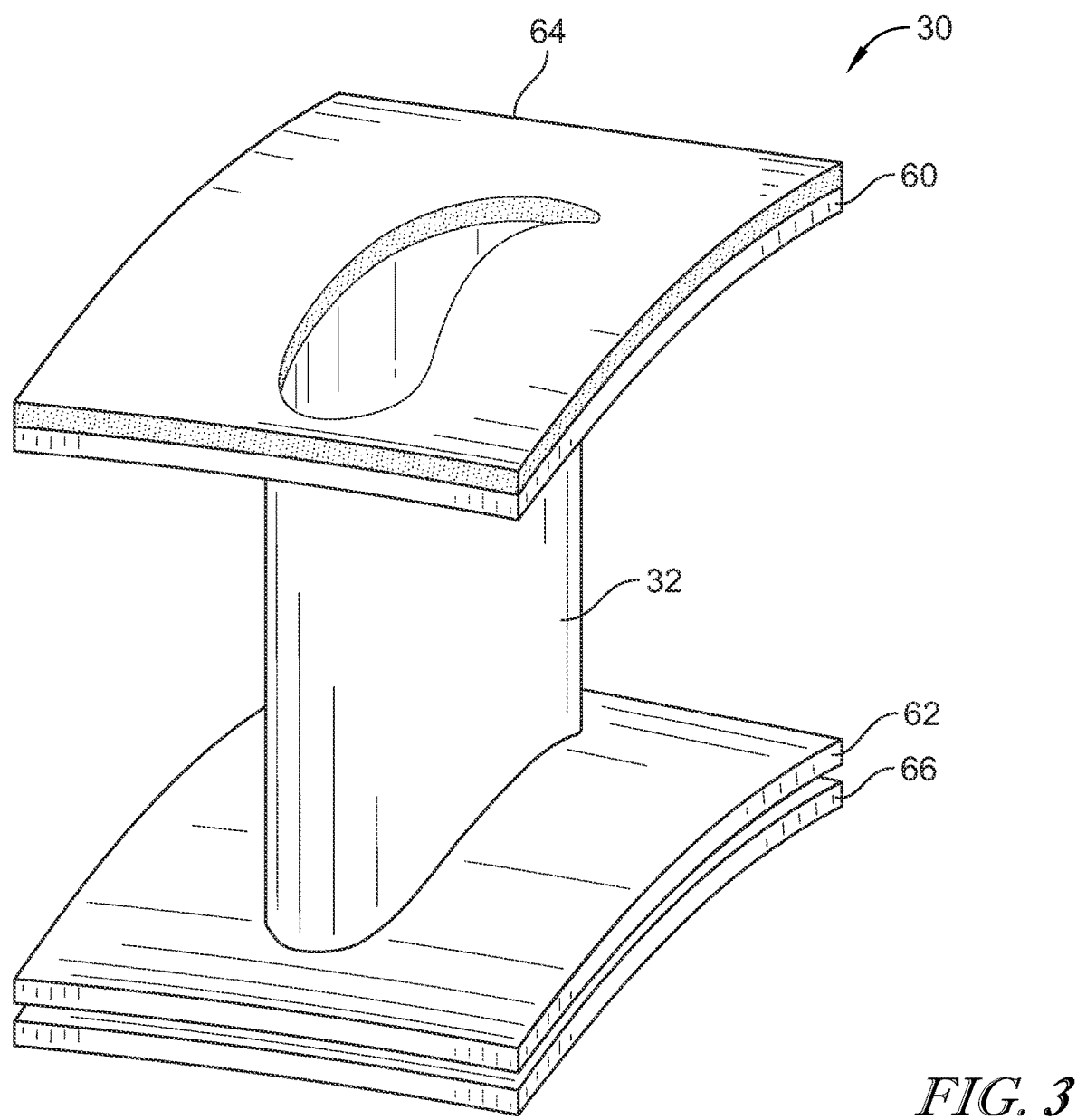
FIG. 3 is a perspective view of a portion of the turbine vane assembly of FIG. 2 showing the turbine vane assembly includes an inner end wall spaced radially inward of an outer end wall and an airfoil extending radially between the inner end wall and the outer end wall, the outer end wall having a layer of metallic foam applied thereon.

Referring to FIG. 3, each vane 30 of the vane stage 24 includes an outer end wall 60, an inner end wall 62, and the airfoil 32. The outer end wall 60 defines a radially outer boundary of the primary gas path 28 and the inner end wall 62 defines a radially inner boundary of the primary gas path 28. The inner end wall 62 is spaced radially inward of the outer end wall 60 relative to a central reference axis 11 to define the primary gas path 28 therebetween. The outer end wall 60 may shield an outer mount panel from the primary gas path 28 and the inner end wall 62 shields an inner seal 66 from the primary gas path 28.

In the illustrative embodiment, the outer end wall 60, inner end wall 62, and the airfoil 32 of the vane 30 are integrally formed from ceramic matrix composite materials such that the outer end wall 60, the inner end wall 62, and the airfoil 32 are included in a one-piece vane component. In other embodiments, the outer end wall 60, inner end wall 62, and the airfoil 32 may be formed as separate components.

A foam 64 is coupled with and extends along a radial outer surface of the outer end wall 60 as shown in FIG. 3. Illustratively, the foam 64 is an open-cell foam. The foam 64 may be metallic or ceramic. The cooling air in cavity 25 passes over and into the foam 64 to cool the outer end wall 60 from the hot combustion products in the gas path 28. The foam 64 controls cooling of the outer end wall 60 via increased surface area of the foam 64 and distribution of impingement flow to alter a thermal gradient along the radial outer surface of the outer end wall 60. Illustratively, the foam 64 extends along the entire radial outer surface of the outer end wall 60. In other embodiments, the foam 64 may extend along discrete portions of the radial outer surface of the outer end wall 60 similar to the foam arrangements shown in FIGS. 8-21 and other arrangements as well. A foam 64 may further be applied to an entire or discrete portions of a radial inner surface of the inner end wall 62 of the vane 30.

Figure 4:
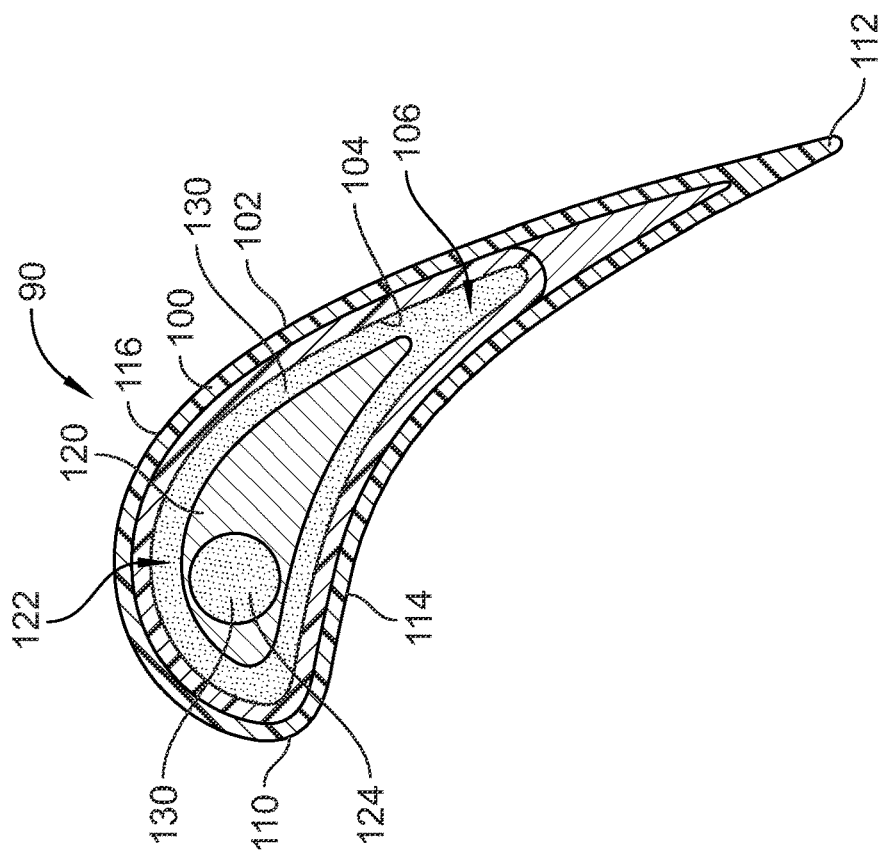
FIG. 4 is a cross sectional view of an airfoil assembly in accordance with the present disclosure showing that the airfoil assembly includes a metallic spar and a ceramic matrix composite airfoil arranged around the spar such that a gap between the spar and the airfoil, wherein the gap is filled with a metallic foam.

Referring now to FIG. 4, an airfoil assembly 90 may be embodied as the vane 30 or the blade 40, as described above. In other words, the features described below may be applied to airfoils used in vanes or blades. The airfoil assembly 90 includes an airfoil 100 having an outer surface 102 exposed to the gas path 28 and an interior surface 104. In some embodiments, the airfoil 100 is formed from ceramic matrix composite materials. The outer surface 102 faces the primary gas path 28. The interior surface 104 is spaced apart from the outer surface 102 and defines a radially-extending passageway 106 that extends radially through the airfoil 100. The interior surface 104 is airfoil-shaped. The outer surface 102 of the airfoil 100 defines a leading edge 110, a trailing edge 112, a pressure side 114, and a suction side 116. The trailing edge 112 is axially spaced apart from the leading edge 110. The suction side 116 is circumferentially spaced apart from the pressure side 114. The pressure side 114 and the suction side 116 extend between and interconnect the leading edge 110 and the trailing edge 112.

A spar 120 extends radially through the radially-extending passageway 106 formed by the airfoil 100 across the primary gas path 28. In some embodiments, the spar 120 is formed from a metallic material. The spar 120 is spaced from the airfoil 100 at all locations along the airfoil 100 such that a gap 122 is maintained between the airfoil 100 and the spar 120. A radially extending passage 124 is formed radially through the spar 120. Illustratively, the spar 120 is airfoil-shaped. In other embodiments, the spar 120 may have other cross-sectional shapes such as circular.

A foam 130 is located between the airfoil 100 and the spar 120 along at least one discrete location to alter at least one of a thermal gradient along the airfoil assembly or an impact resistance along the airfoil assembly 90. The foam 130 functions as a damage-tolerant sacrificial foam to provide energy absorption in the airfoil assembly 90. The foam 130 also interfaces with the spar 120 to provide further energy transfer within the airfoil assembly 90 to minimize damage to the ceramic matrix composite materials. The foam 130 may be used to control cooling inside the airfoil assembly 90 via the interaction between the foam 130 and the cooling air that enters the passageway 106.

The foam 130 is described below, but the description of the foam 130 applies to all foams described in the present application. Illustratively the foam 130 is an open-cell foam. In some embodiments, the foam 130 may be formed from cobalt alloy and/or silicon carbide. In some embodiments, the foam includes another metallic or ceramic foam. For example, the foam may be a high-temperature cobalt alloy foam. The foam 130 may be ceramic such as SiC foam. The foam 130 may directly engage the airfoil 100 and the spar 120. For example, the foam 130 can be brazed, bonded, or otherwise slid onto the metallic spar in a single piece or multiple pieces to fill at least a portion of the gap 122 between the airfoil 100 and the spar 120. In an uncooled ceramic matrix composite application, the foam 130 could be formed within the ceramic matrix composite structure to maximise conformance to the ceramic matrix composite profile.

In the embodiment of the airfoil 100 illustrated in FIG. 4, the gap 122 is airfoil-shaped and the entire gap 122 between the airfoil 100 and the spar 120 is filled with the foam 130. In the illustrated embodiment, the radially extending passage 124 of the spar 120 is likewise entirely filled with the foam 130. In some embodiments, the radially extending passage 124 of the spar 120 is not filled with the foam 130. It will be appreciated that the foam 130 provides more surface area for heat-transfer within the airfoil assembly 90 and can serve as a load transfer feature with sufficient compliance to distribute loads and accommodate for coefficient of thermal expansion mismatch. In some embodiments, the foam 130 may also reduce a radiation 'view factor' between the CMC and metallic sub-structure.

Figure 5:
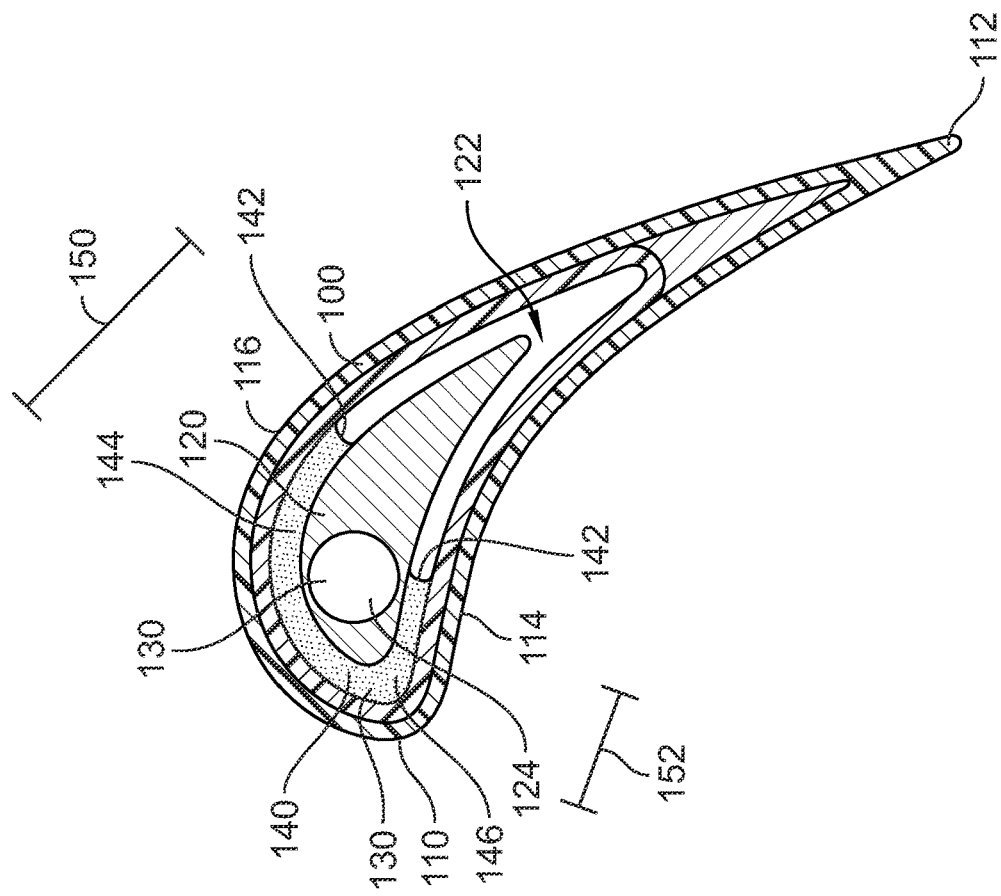
FIG. 5 is a cross-sectional view of an airfoil assembly in accordance with the present disclosure showing that the airfoil assembly includes a metallic spar and a ceramic matrix composite airfoil arranged around the spar such that a gap between the spar and the airfoil, wherein a leading edge of the gap is filled with a metallic foam.

Referring to FIG. 5, in another embodiment of the airfoil assembly 90, the foam 130 extends along a segment 140 of the airfoil 100 that includes a portion of the pressure side 114, the leading edge 110, and a portion of the suction side 116. In the illustrated embodiment, the segment 140 is generally C-shaped. The segment 140 includes terminal ends 142 that are exposed to air located in the gap 122. In some embodiments, a length 150 of a portion 144 of the suction side 116 of the segment 140 is greater than a length 152 of a portion 146 of the pressure side 114 of the segment 140. In FIG. 5, the radially extending passage 124 of the spar 120 is not filled with the foam 130. In some embodiments, the radially extending passage 124 of the spar 120 is filled with the foam 130.

Figure 6:
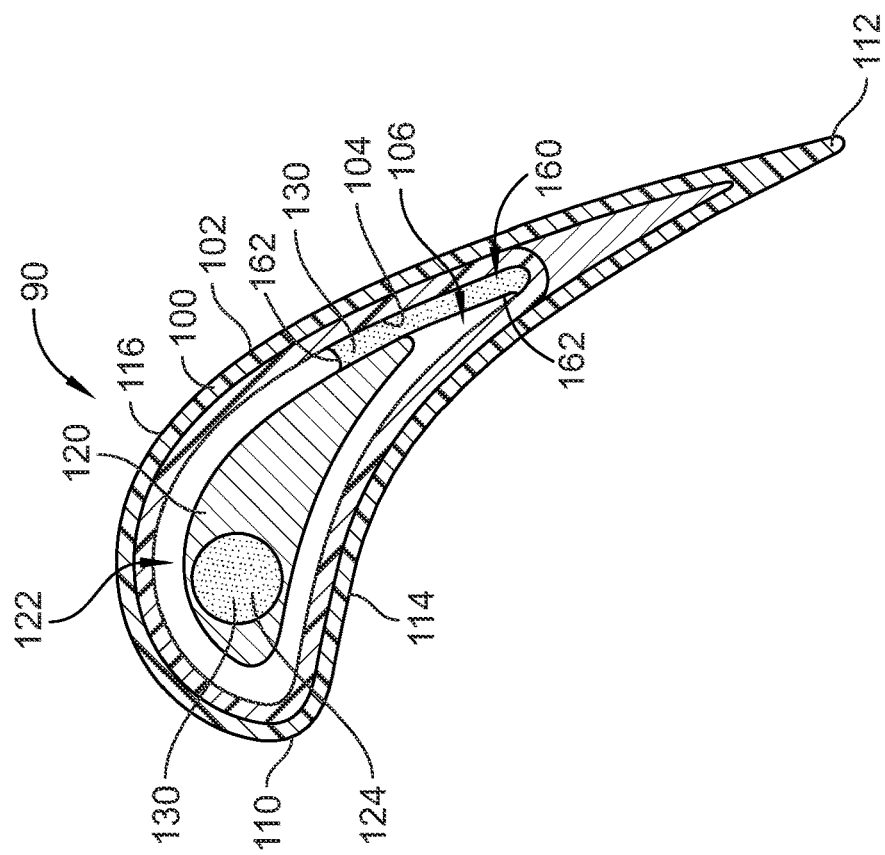
FIG. 6 is a cross-sectional view of an airfoil assembly in accordance with the present disclosure showing that the airfoil assembly includes a metallic spar and a ceramic matrix composite airfoil arranged around the spar such that a gap between the spar and the airfoil, wherein a trailing edge of the gap is filled with a metallic foam.

FIG. 6 illustrates yet another embodiment of the airfoil assembly 90, wherein a segment 160 of foam 130 is formed at a trailing edge 112 of the airfoil 100 and extends partially along the suction side 116 of the airfoil 100. The segment 160 includes terminal ends 162 that are exposed to air located in the gap 122. In FIG. 6, the radially extending passage 124 of the spar 120 is likewise filled with the foam 130. In some embodiments, the radially extending passage 124 of the spar 120 is not filled with the foam 130.

Figure 7:
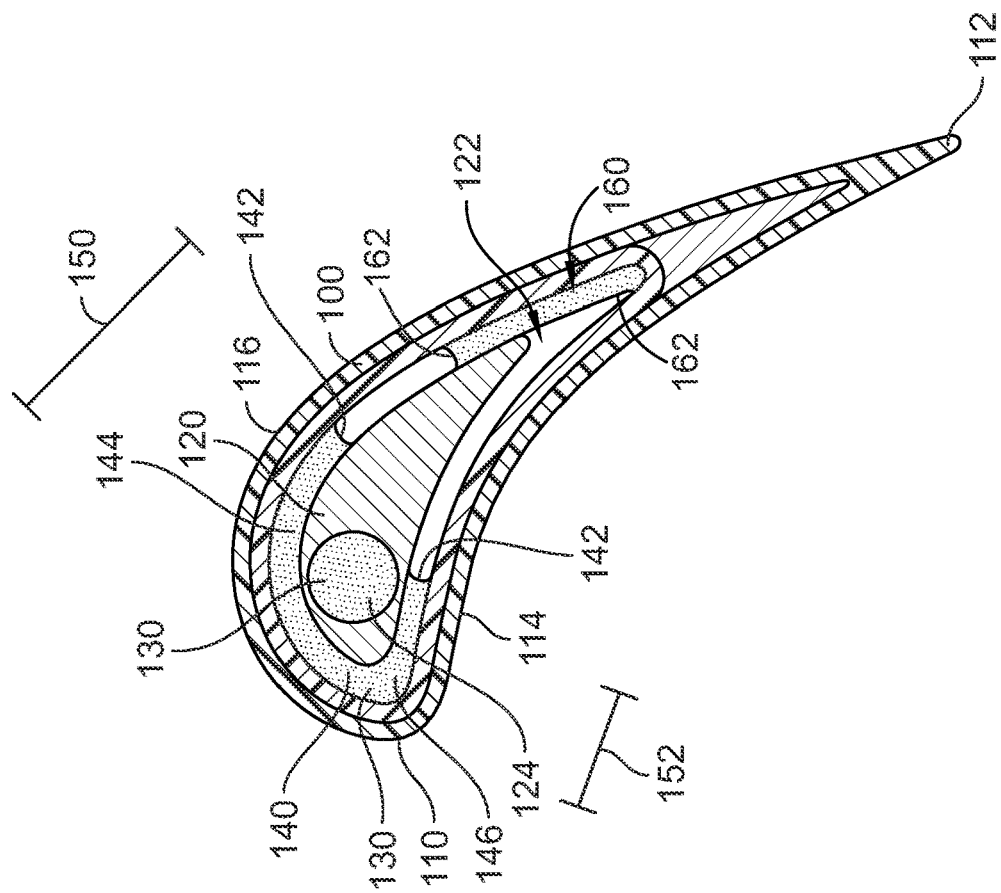
FIG. 7 is a cross-sectional view of an airfoil assembly in accordance with the present disclosure showing that the airfoil assembly includes a metallic spar and a ceramic matrix composite airfoil arranged around the spar such that a gap between the spar and the airfoil, wherein a both a leading edge and a trailing edge of the gap is filled with a metallic foam.

FIG. 7 illustrates an embodiment of the airfoil assembly 90 that includes both the segment 140 and the segment 160. In such an embodiment, the segment 140 is spaced apart from the segment 160 to allow airflow between and along the segment 140 and the segment 160. That is, the terminal ends 142 of the segment 140 are spaced apart from the terminal ends 162 of the segment 160 to allow airflow through the gap 122 between the segment 140 and the segment 160. In FIG. 7, the radially extending passage 124 of the spar 120 is likewise filled with the foam 130. In some embodiments, the radially extending passage 124 of the spar 120 is not filled with the foam 130.

In the embodiments illustrated in FIGS. 4-7, a density of the foam 130 may be altered to alter a thermal gradient along the airfoil assembly 90 or to alter an impact resistance along the airfoil assembly 90. In some embodiments, the density of the foam 130 is increased to alter the thermal gradient along the airfoil assembly 90 or to alter the impact resistance along the airfoil assembly 90. In some embodiments, the density of the foam 130 is decreased to alter the thermal gradient along the airfoil assembly 90 or to alter the impact resistance along the airfoil assembly 90. In some embodiments, the density of the foam 130 is increased in some areas and decreased in other areas to alter the thermal gradient along the airfoil assembly 90 or to alter the impact resistance along the airfoil assembly 90.

In some embodiments, a likelihood of impact is higher at the leading edge 110. Accordingly, smaller pores (less coarse) are provided to increase the energy absorption. However, a stagnation point on the leading edge 110 is the hottest region of the airfoil assembly 90. Accordingly, convective and radiative cooling is enhanced with larger pores (more coarse). At the leading edge 110, the foam relative density could be increased to increase the conductive heat transfer and energy absorption. As such, the specific properties at each location of the airfoil assembly 90 are a compromise for that specific design, depending on the relative magnitude of risks between thermal gradient and impact. Alternatively, from dedicated cooling holes could be created through the foam structure.

Figure 8:
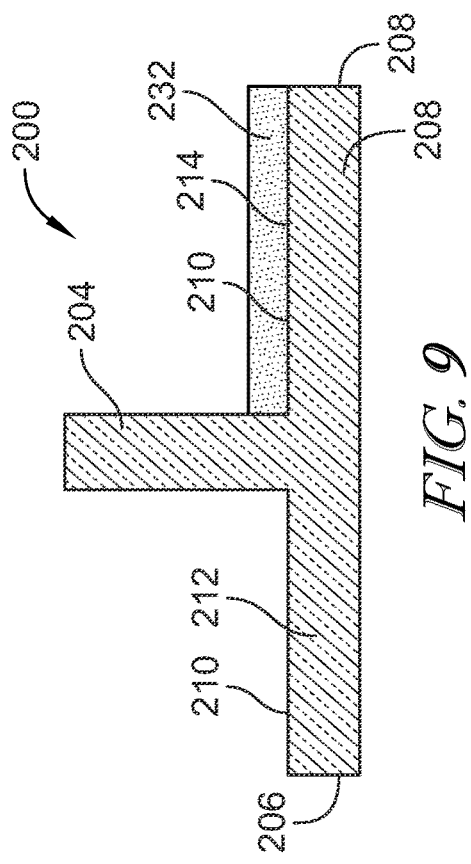
FIG. 8 is a cross-sectional view of the turbine shroud assembly of FIG. 2 showing that the turbine shroud assembly includes a shroud wall and an attachment feature extending radially from the shroud wall, wherein metallic foam is located on a radially outer surface of the shroud wall.

Referring now to FIG. 8, a turbine shroud assembly 200 may be embodied as the turbine shroud 26, as described above. The turbine shroud assembly 200 include a shroud wall 202 that extends circumferentially partway around the central reference axis 11 and an attachment feature 204 that extends radially from the shroud wall 202. The shroud wall 202 extends between a forward end 206 and an aft end 208. The attachment feature 204 extends from the shroud wall 202 and is located axially between the forward end 206 and the aft end 208. The shroud wall 202 includes a radially outer surface 210. The attachment feature 204 extends radially outward from the radially outer surface 210 and divides the radially outer surface 210 into a forward surface 212 and an aft surface 214. The forward surface 212 extends between the attachment feature 204 and the forward end 206. The aft surface 214 extends between the attachment feature 204 and the aft end 208.

A foam 220 is located on the radially outer surface 210 to alter at least one of a thermal gradient along the turbine shroud assembly 200 or an impact resistance along the turbine shroud assembly 200. The foam 220 functions as a damage-tolerant sacrificial foam to provide energy absorption in the turbine shroud assembly 200. The foam 220 may further control cooling of the radially outer surface 210 via the interaction with the cooling air in cavity 25 or 23. The locations described for the foam 220 apply to the foam 64 described above. In some embodiments, the foam 220 is a metallic foam and may be formed from cobalt alloy and/or silicon carbide. For example, the foam 220 may be a high-temperature cobalt alloy foam. The foam 220 may directly engage the shroud wall 202. For example, the foam 220 can be brazed, bonded, or otherwise slid onto the shroud wall 202 in a single piece or multiple pieces.

In the embodiment illustrated in FIG. 8, a section 230 of the foam 220 is located on the forward surface 212 and extends from the attachment feature 204 to the forward end 206. A section 232 of the foam 220 is located on the aft surface 214 and extends between the attachment feature 204 and the aft end 208.

Figure 9:
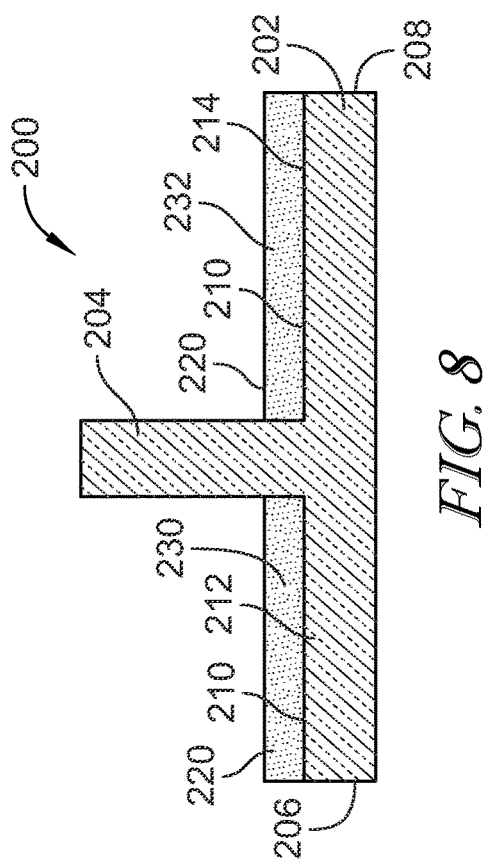
FIG. 9 is a cross-sectional view of a turbine shroud assembly in accordance with the present disclosure showing that the turbine shroud assembly includes a shroud wall and an attachment feature extending radially from the shroud wall, wherein metallic foam is located on an aft portion of the radially outer surface of the shroud wall.
Figure 10:
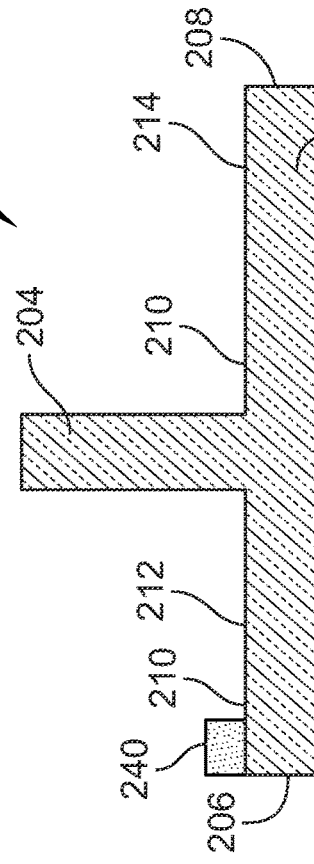
FIG. 10 is a cross-sectional view of a turbine shroud assembly in accordance with the present disclosure showing that the turbine shroud assembly includes a shroud wall and an attachment feature extending radially from the shroud wall, wherein metallic foam is located on a forward portion of the radially outer surface of the shroud wall.

FIG. 9 illustrates an embodiment of the turbine shroud assembly 200, wherein only the section 232 of the foam 220 is located on the radially outer surface 210 of the shroud wall 202 and extends along the aft surface 214 between the attachment feature 204 and the aft end 208. FIG. 10 illustrates an embodiment of the turbine shroud assembly 200, wherein only the section 230 of the foam 220 is located on the radially outer surface 210 of the shroud wall 202 and extends along the forward surface 212 between the attachment feature 204 and the forward end 206.

Figure 11:
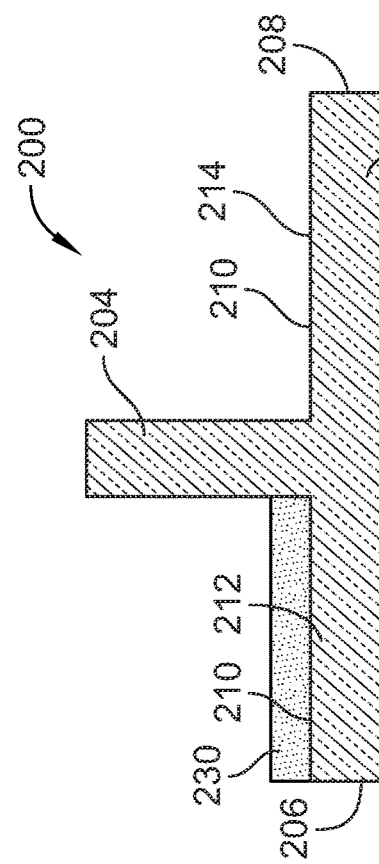
FIG. 11 is a cross-sectional view of a turbine shroud assembly in accordance with the present disclosure showing that the turbine shroud assembly includes a shroud wall and an attachment feature extending radially from the shroud wall, wherein metallic foam is located partially along a forward portion of the radially outer surface of the shroud wall.
Figure 12:
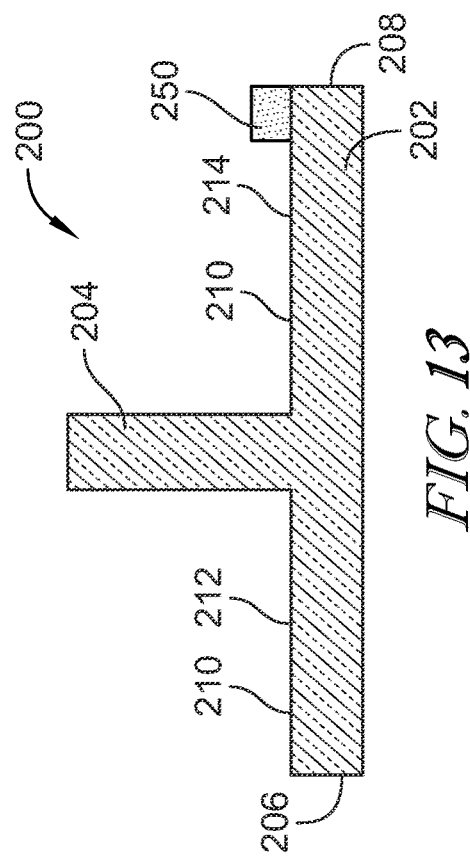
FIG. 12 is a cross-sectional view of a turbine shroud assembly in accordance with the present disclosure showing that the turbine shroud assembly includes a shroud wall and an attachment feature extending radially from the shroud wall, wherein metallic foam is located partially along a forward portion of the radially outer surface of the shroud wall and on an aft portion of the radially outer surface of the shroud wall.

Referring now to FIG. 11, in another embodiment of the turbine shroud assembly 200, a section 240 of the foam 220 is located on the forward surface 212. The section 240 extends at least partially between the forward end 206 and the attachment feature 204. In the illustrative embodiment, the section 240 is spaced apart from the attachment feature 204 and positioned adjacent the forward end 206. It will be appreciated, that the section 240 of foam 220 may be positioned at any axial location between the attachment feature 204 and the forward end 206. In the embodiment illustrated in FIG. 12, the turbine shroud assembly 200 includes the section 240 and the section 232 of foam 220 that extends along the aft surface 214 fully between the attachment feature 204 and the aft end 208.

Figure 13:
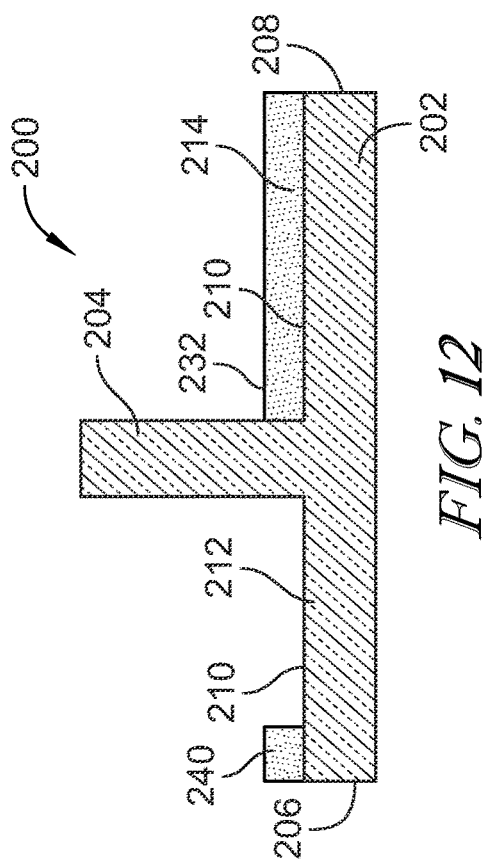
FIG. 13 is a cross-sectional view of a turbine shroud assembly in accordance with the present disclosure showing that the turbine shroud assembly includes a shroud wall and an attachment feature extending radially from the shroud wall, wherein metallic foam is located partially along an aft portion of the radially outer surface of the shroud wall.
Figure 14:
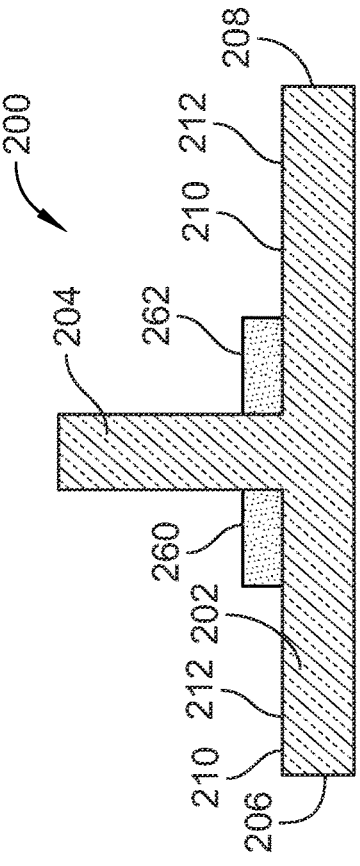
FIG. 14 is a cross-sectional view of a turbine shroud assembly in accordance with the present disclosure showing that the turbine shroud assembly includes a shroud wall and an attachment feature extending radially from the shroud wall, wherein metallic foam is located partially along an aft portion of the radially outer surface of the shroud wall and on a forward portion of the radially outer surface of the shroud wall.

Referring to FIG. 13, in yet another embodiment of the turbine shroud assembly 200, a section 250 of the foam 220 is located on the aft surface 214. The section 250 extends at least partially between the aft end 208 and the attachment feature 204. In the illustrative embodiment, the section 250 is spaced apart from the attachment feature 204 and positioned adjacent the aft end 208. It will be appreciated, that the section 250 of foam 220 may be positioned at any axial location between the attachment feature 204 and the aft end 208. In the embodiment illustrated in FIG. 14, the turbine shroud assembly 200 includes the section 250 and the section 230 of foam 220 that extends along the forward surface 212 fully between the attachment feature 204 and the forward end 206.

Figure 15:
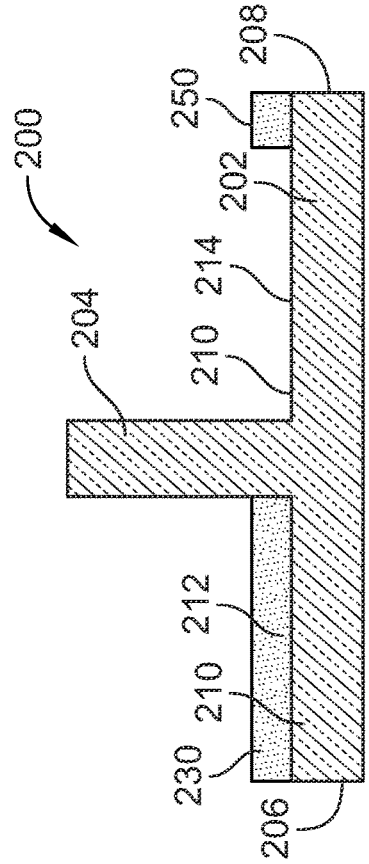
FIG. 15 is a cross-sectional view of a turbine shroud assembly in accordance with the present disclosure showing that the turbine shroud assembly includes a shroud wall and an attachment feature extending radially from the shroud wall, wherein metallic foam is located partially along an aft portion of the radially outer surface of the shroud wall and partially along a forward portion of the radially outer surface of the shroud wall.

Referring now to FIG. 15, in another embodiment of the turbine shroud assembly 200, a section 260 of the foam 220 is located on the forward surface 212. The section 260 extends at least partially between the forward end 206 and the attachment feature 204. In the illustrative embodiment, the section 260 is positioned adjacent the attachment feature 204. A section 262 of the foam 220 is located on the aft surface 214. The section 262 extends at least partially between the aft end 208 and the attachment feature 204. In the illustrative embodiment, the section 262 is positioned adjacent the attachment feature 204.

Figure 16:
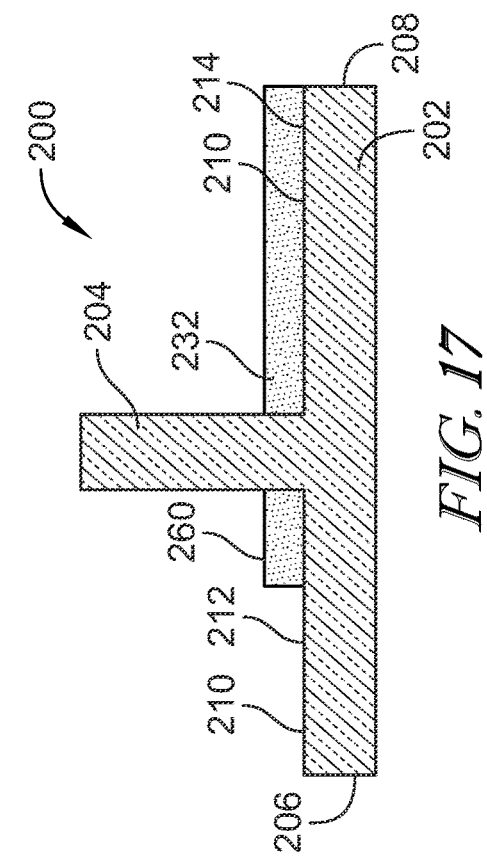
FIG. 16 is a cross-sectional view of a turbine shroud assembly in accordance with the present disclosure showing that the turbine shroud assembly includes a shroud wall and an attachment feature extending radially from the shroud wall, wherein metallic foam is located partially along a forward portion of the radially outer surface of the shroud wall.
Figure 17:
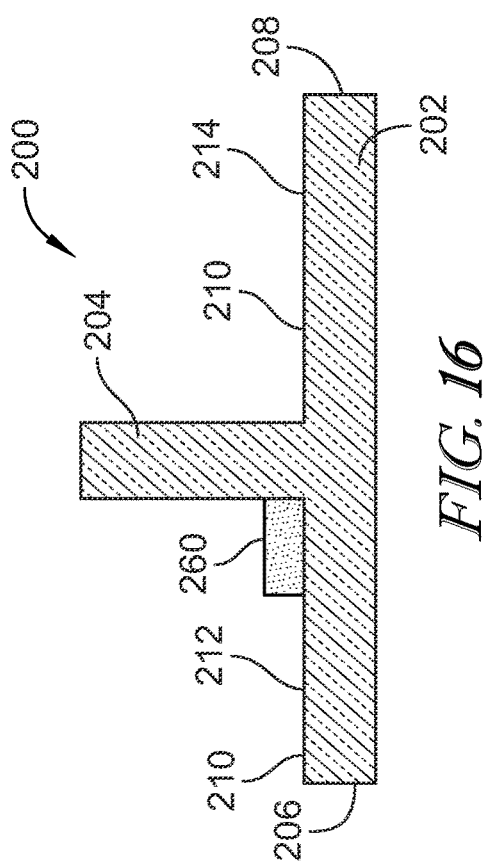
FIG. 17 is a cross-sectional view of a turbine shroud assembly in accordance with the present disclosure showing that the turbine shroud assembly includes a shroud wall and an attachment feature extending radially from the shroud wall, wherein metallic foam is located partially along a forward portion of the radially outer surface of the shroud wall and on an aft portion of the radially outer surface of the shroud wall.
Figure 18:
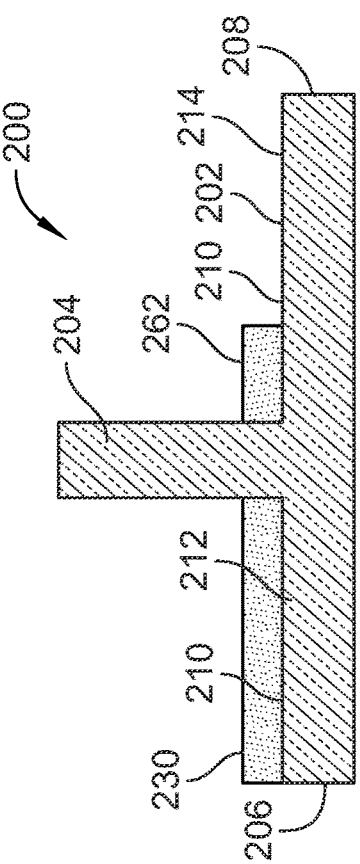
FIG. 18 is a cross-sectional view of a turbine shroud assembly in accordance with the present disclosure showing that the turbine shroud assembly includes a shroud wall and an attachment feature extending radially from the shroud wall, wherein metallic foam is located partially along an aft portion of the radially outer surface of the shroud wall.
Figure 19:
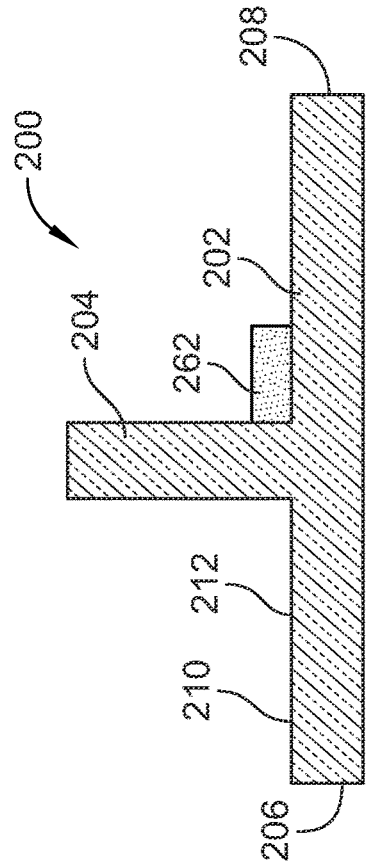
FIG. 19 is a cross-sectional view of a turbine shroud assembly in accordance with the present disclosure showing that the turbine shroud assembly includes a shroud wall and an attachment feature extending radially from the shroud wall, wherein metallic foam is located partially along an aft portion of the radially outer surface of the shroud wall and on a forward portion of the radially outer surface of the shroud wall.

The embodiment illustrated in FIG. 16 includes only the section 260 of foam 220 on the forward surface 212. As illustrated in FIG. 17, the turbine shroud assembly 200 may include the section 260 on the forward surface 212 and the section 232 of foam 220 that extends along the aft surface 214 fully between the attachment feature 204 and the aft end 208. The embodiment illustrated in FIG. 18 includes only the section 262 of foam 220 on the aft surface 214. As illustrated in FIG. 19, the turbine shroud assembly 200 may include the section 262 on the aft surface 214 and the section 230 of foam 220 that extends along the forward surface 212 fully between the attachment feature 204 and the forward end 206.

It will be appreciated that the turbine shroud assembly 200 may include any combination of foam sections, as described above, or as contemplated by one of ordinary skill in the art. It will also be appreciated that any of the airfoil assemblies 90 illustrated in FIGS. 4-7 may be used with any of the turbine shroud assemblies 200 illustrated in FIGS. 8-19.

Additionally, in the embodiments illustrated in FIGS. 8-19, a density of the foam 220 may be altered to alter a thermal gradient along the turbine shroud assembly 200 or to alter an impact resistance along the turbine shroud assembly 200. In some embodiments, the density of the foam 220 is increased to alter the thermal gradient along the turbine shroud assembly 200 or to alter the impact resistance along the turbine shroud assembly 200. In some embodiments, the density of the foam 220 is decreased to alter the thermal gradient along the turbine shroud assembly 200 or to alter the impact resistance along the turbine shroud assembly 200. In some embodiments, the density of the foam 220 is increased in some areas and decreased in other areas to alter the thermal gradient along the turbine shroud assembly 200 or to alter the impact resistance along the turbine shroud assembly 200.

Figure 20:
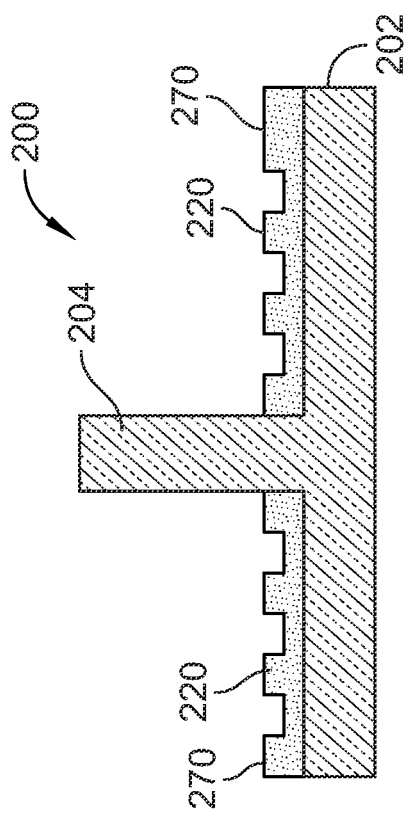
FIG. 20 is a cross-sectional view of a turbine shroud assembly in accordance with the present disclosure showing that the turbine shroud assembly includes a shroud wall and an attachment feature extending radially from the shroud wall, wherein metallic foam having ridges is located on the radially outer surface of the shroud wall.

Referring now to FIG. 20, the foam 220 may be formed to include ridges 270 that alter the thermal gradient along the turbine shroud assembly 200 or alter the impact resistance along the turbine shroud assembly 200. Although the ridges 270 are shown as being evenly applied to the foam 220 in FIG. 20, it will be appreciated that the ridges 270 may be applied in any pattern. It will also be appreciated that the ridges 270 may be applied to any formation of foam 220 as described in FIGS. 8-19. Moreover, in some embodiments, ridges 270 may be applied to the formations of foam 130 described in FIGS. 4-7 to alter the thermal gradient along the airfoil assembly 90 or to alter the impact resistance along the airfoil assembly 90.

Figure 21:
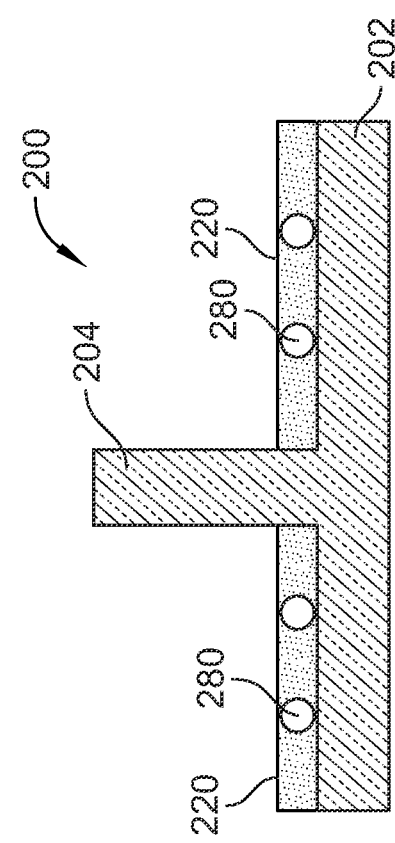
FIG. 21 is a cross-sectional view of a turbine shroud assembly in accordance with the present disclosure showing that the turbine shroud assembly includes a shroud wall and an attachment feature extending radially from the shroud wall, wherein metallic foam having channels is located on the radially outer surface of the shroud wall.

Referring to FIG. 21, the foam 220 may be formed to include channels 280 that alter the thermal gradient along the turbine shroud assembly 200 or alter the impact resistance along the turbine shroud assembly 200. Although the channels 280 are shown as being evenly applied to the foam 220 in FIG. 21, it will be appreciated that the channels 280 may be applied in any pattern. It will also be appreciated that the channels 280 may be applied to any formation of foam 220 as described in FIGS. 8-19. Moreover, in some embodiments, channels 280 may be applied to the formations of foam 130 described in FIGS. 4-7 to alter the thermal gradient along the airfoil assembly 90 or to alter the impact resistance along the airfoil assembly 90.

The use of metallic and ceramic open-cell foams facilitates controlling cooling flow through an increased surface area and distribution of impingement flow along the engine components. The foam is readily machinable so that passages and/or augmentation features can be created in the foam to direct cooling flows. Improvements in a heat transfer area of the component could be further modified by grading the flow with intentional holes, blockages and ligament/pore size within discrete foam inserts.

Impingement cooling schemes typically create hot spots, and thus high localized thermal gradients. These high gradients increase thermal stresses, which can increase damage and reduce the life of components in service. The use of porous foams on the material surface can enable flow distribution to eliminate impingement hot spots. The embodiments described herein could be extended to metallic parts, for example, the embodiments could be used to more accurately locate an impingement tube within an aerofoil. The addition of foam inserts to platforms either as part of an impingement plate or discretely may enable the tailoring of cooling behaviour.

While the disclosure has been illustrated and described in detail end in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil assembly for a gas turbine engine, the assembly comprising:
    an airfoil made of ceramic matrix composite materials and extending radially relative to a central reference axis,
    a spar made of metallic materials that is located within the airfoil and spaced from the airfoil at all locations along an inner surface of the airfoil such that a gap is maintained between the inner surface of the airfoil and the spar, and
    a first foam located between the airfoil and the spar along at least one discrete location to alter at least one of a thermal gradient or an impact resistance along the airfoil assembly,
    wherein the spar is formed to define a radially extending passage that extends radially therethrough relative to the central reference axis and the airfoil assembly further includes a second foam located in the radially extending passage,
    wherein the first foam and the second foam are each at least one of a metallic foam and a ceramic foam, and
    wherein the radially extending passage is circular and the second foam is circular and extends along the spar along an entire circumference of the radially extending passage.

2. The airfoil assembly of claim 1, wherein the first foam engages directly the airfoil and the spar.

3. The airfoil assembly of claim 1, wherein the gap is airfoil-shaped and the entire gap is filled with the first foam.

4. The airfoil assembly of claim 1, wherein the first foam and the second foam are formed from at least one of a cobalt alloy and silicon carbide.

5. The airfoil assembly of claim 1, wherein the airfoil has a leading edge, a trailing edge, a pressure side, and a suction side and the first foam extends along a first segment of the airfoil that includes a portion of the pressure side, the leading edge, and a portion of the suction side such that first segment is generally C-shaped.

6. The airfoil assembly of claim 5, wherein terminal ends of the first segment are exposed to air located in the gap.

7. The airfoil assembly of claim 5, wherein a length of the portion of the suction side of the first segment is greater than a length of the portion of the pressure side of the first segment.

8. The airfoil assembly of claim 1, wherein the at least one discrete location includes a first section of the first foam at a trailing edge of the airfoil and extending partially along a suction side of the airfoil.

9. The airfoil assembly of claim 8, wherein the at least one discrete location includes a second section of the first foam at a leading edge of the airfoil and extending partially along a pressure side of the airfoil and partially along a suction side of the airfoil and the second section is spaced apart from the first section to allow airflow between and along the first section and the second section.

10. The airfoil assembly of claim 1, wherein the airfoil extends to a terminal end and is configured to rotate about the central reference axis.

11. The airfoil assembly of claim 1, further comprising an inner end wall spaced radially inward of an outer end wall relative to the central reference axis and a third foam, wherein the airfoil extends radially between the inner end wall and the outer end wall and wherein the third foam extends along a radial outer surface of the outer end wall.

12. An airfoil assembly for a gas turbine engine, the assembly comprising:
    an airfoil extending radially relative to a central reference axis,
    a spar that is located within the airfoil and spaced from the airfoil at all locations along the airfoil such that a gap is maintained between the airfoil and the spar, and
    a first foam located between the airfoil and the spar along at least one discrete location to alter at least one of a thermal gradient or an impact resistance along the airfoil assembly,
    wherein the spar is formed to define a radially extending passage that extends radially therethrough relative to the central reference axis and the airfoil assembly further includes a second foam located in the radially extending passage, and
    wherein the radially extending passage is circular and the second foam is circular and extends along the spar along an entire circumference of the radially extending passage.

13. The airfoil assembly of claim 12, wherein:
    the airfoil has a leading edge, a trailing edge, a pressure side, and a suction side and the first foam extends along a first segment of the airfoil that includes a portion of the pressure side, the leading edge, and a portion of the suction side such that first segment is generally C-shaped,
    terminal ends of the first segment are exposed to air located in the gap, and
    a length of the portion of the suction side of the first segment is greater than a length of the portion of the pressure side of the first segment.

14. The airfoil assembly of claim 12, wherein the at least one discrete location includes:
    a first section of the first foam at a trailing edge of the airfoil and extending partially along a suction side of the airfoil, and
    a second section of the first foam at a leading edge of the airfoil and extending partially along a pressure side of the airfoil and partially along a suction side of the airfoil and the second section is spaced apart from the first section to allow airflow between and along the first section and the second section.

15. The airfoil assembly of claim 12, wherein the airfoil extends to a terminal end and is configured to rotate about the central reference axis.

16. The airfoil assembly of claim 12, further comprising an inner end wall spaced radially inward of an outer end wall relative to the central reference axis and a third foam, wherein the airfoil extends radially between the inner end wall and the outer end wall and wherein the third foam extends along a radial outer surface of the outer end wall.

17. A method of adapting an airfoil assembly for use in a gas turbine engine, the method comprising:
  extending an airfoil radially outward from a central reference axis,
  spacing a spar from the airfoil at all locations along the airfoil such that a gap is maintained between the airfoil and the spar, the spar formed to define a radially extending passage that extends radially therethrough relative to the central reference axis,
  locating a first foam between the airfoil and the spar along at least one discrete location to alter at least one of a thermal gradient along the airfoil assembly or an impact resistance along the airfoil assembly, and
  locating a second foam in the radially extending passage formed in the spar, wherein the first foam and the second foam are each at least one of a metallic foam and a ceramic foam, and
  wherein the radially extending passage is circular and the second foam is circular and extends along the spar along an entire circumference of the radially extending passage.

18. The method of claim 17, further comprising dispersing a section of the first foam only at a leading edge of the vane and extending partially along a pressure side of the vane and partially along a suction side of the vane.

19. The method of claim 17, further comprising dispersing a section of the first foam only at a trailing edge of the vane and extending partially along a suction side of the vane.

* * * * *